May 6, 1958 — M. S. SISULAK — 2,833,409
CROP CLASSIFIER FOR COTTON HARVESTERS
Filed Oct. 28, 1954 — 2 Sheets-Sheet 1
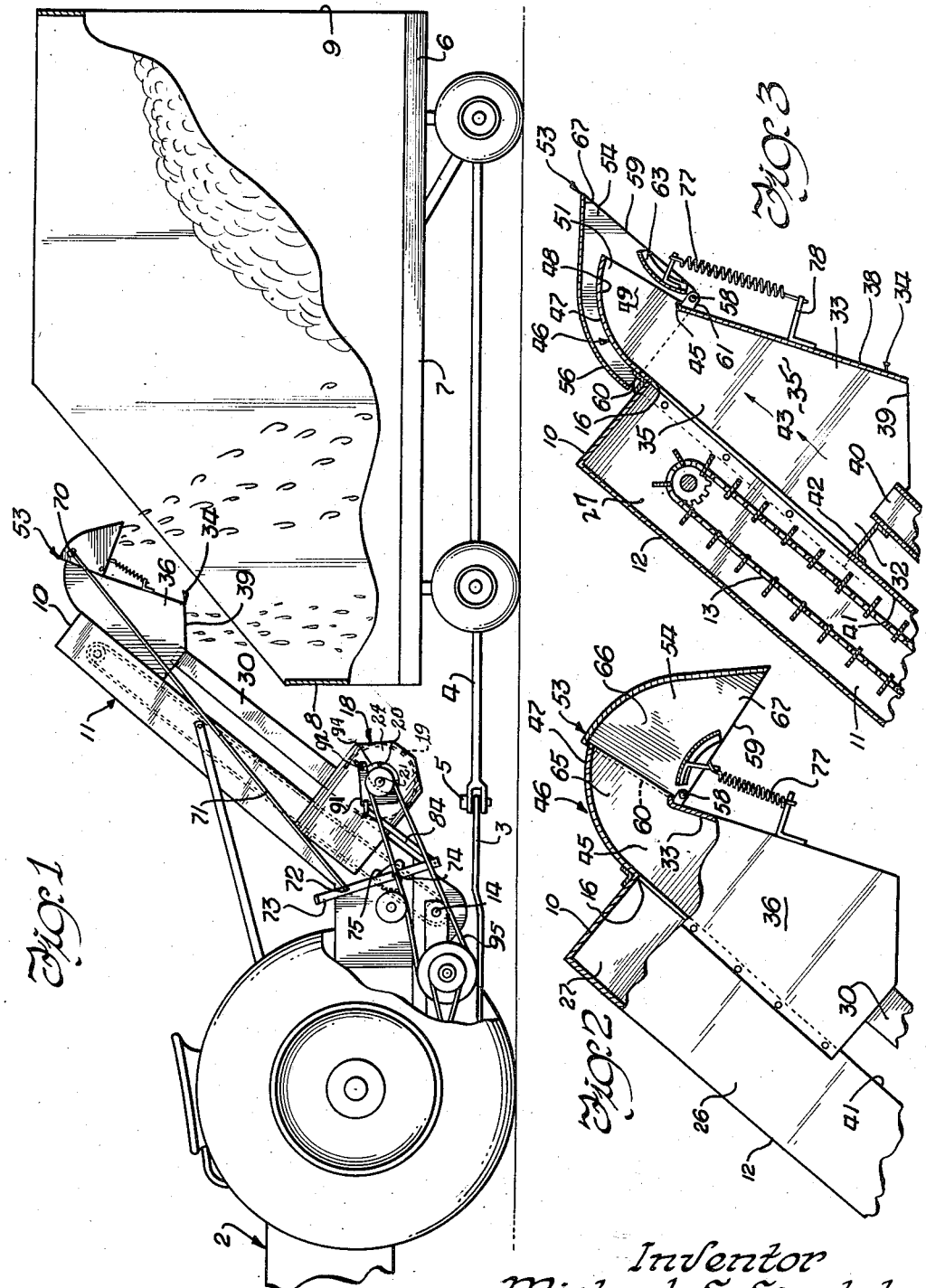
Inventor
Michael S. Sisulak
Atty.

May 6, 1958 M. S. SISULAK 2,833,409
CROP CLASSIFIER FOR COTTON HARVESTERS
Filed Oct. 28, 1954 2 Sheets-Sheet 2
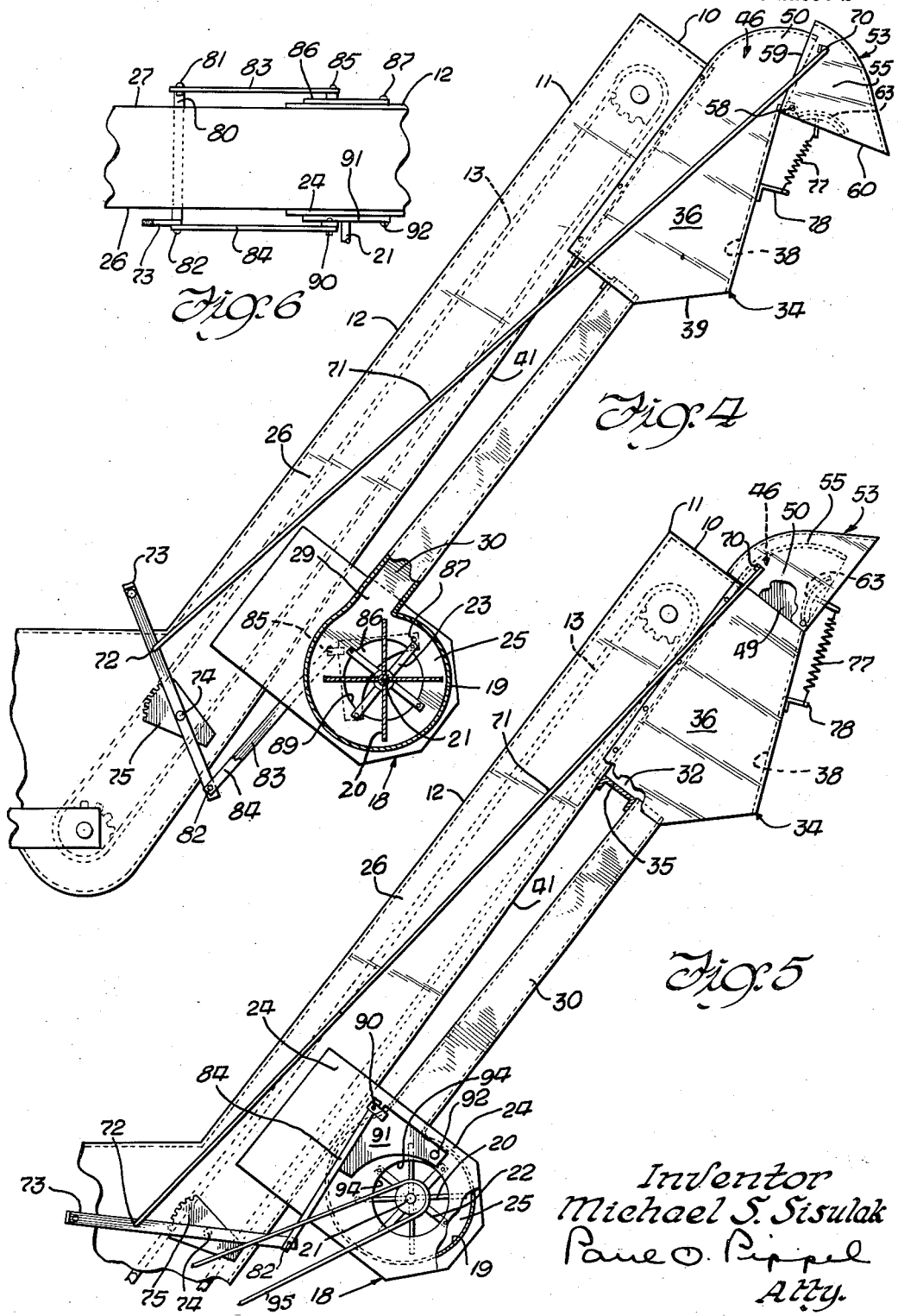
Inventor
Michael S. Sisulak
Paul O. Pippel
Atty.

United States Patent Office 2,833,409
Patented May 6, 1958

2,833,409

CROP CLASSIFIER FOR COTTON HARVESTERS

Michael S. Sisulak, Chicago, Ill., assignor to International Harvester Company, a corporation of New Jersey Application October 28, 1954, Serial No. 465,412

8 Claims. (Cl. 209—137)

This invention relates to cotton harvesters of the type normally known as cotton strippers and more specifically to a novel crop classifier adapted to be associated therewith.

A general object of the invention is to provide a crop classifier which is attachable to the underside of a cotton elevator of a conventional cotton stripper.

A more specific object of the invention is to provide a novel classifier which incorporates a deflector positioned beneath the discharge opening at the upper end of the cotton elevator, the deflector having a forwardly open end for guiding heavy bodies such as green bolls and the like to the forward end of a trailing wagon which the upper end of the elevator overhangs, the forward open end of the guide being associated with a blower which is adapted to blow an air stream through the descending aggregate from the elevator to the deflector and the blower being adapted to blow the light cotton rearwardly and upwardly into a novel hood which is pivotal to discharge the cotton to the far end of the wagon when it is empty and progressively toward the front end of the wagon as it is filled.

A further object of the invention is to provide such a novel hood structure which provides a constricted passage functioning in the manner of a venturi to provide a high air velocity in the position of the hood when the cotton is to be discharged farthest and the hood being formed and arranged to progressively reduce this effect when the invention is to reduce the distance at which the cotton is to be discharged.

A further object of the invention is to devise a novel means for proportioning the amount of air issuing from the blower in relation to the requirement as to the distance at which the cotton is to be blown.

More specifically the invention contemplates the provision of valve means for varying the amount of air adapted to be introduced into the blower in direct relation to the position of the hood.

These and other objects of the invention will become more apparent from the specification and drawings wherein:

Figure 1 is a side elevational view of the pertinent portion of a cotton harvester and trailing wagon with the novel cotton classifier and distributor associated therewith, portions of this structure being broken away in order to clarify the illustration;

Figure 2 is a fragmentary side elevational view of the cotton classifying chamber and hood construction with portions shown in vertical cross section and the hood positioned in a downwardly discharging position;

Figure 3 is a further longitudinal sectional view illustrating the hood in a rearwardly discharging position;

Figures 4 and 5 are side elevational views illustrating two extreme positions of the hood and the blower controls; and Figure 6 is a fragmentary plan view of the linkage for operating the blower controls.

Describing the invention in detail, the tractor generally designated 2 is provided with the drawbar 3, which is pivotally connected to a draft member 4 as at 5, the member 4 being connected to a trailing wagon, generally indicated 6, which includes a box 7 having forward and rear ends 8 and 9, the forward end 8 underlying the upper rear end 10 of an elevator 11 of a cotton harvester of the type shown in U. S. Patents 2,677,226, or 2,654,201. The elevator 11 comprises a housing 12 having an endless conveyor 13 disposed therein and the conveyor is operated by means of a driving connection with a power shaft 14 which is operatively connected to the power take-off of the tractor as described in the aforementioned patents. The housing 12 has a bottom discharge opening 16 at its upper end to which the material is discharged downwardly.

The housing 12 supports a blower generally designated 18 therebeneath, said blower incorporating a substantially cylindrical blower chamber 19 within which is supported a vaned fan 20 which is mounted on a shaft 21, said shaft 21 being carried on bearings 22 and 23 which are mounted on end panels 24 and 25, which close opposite ends of the fan cage 19. These panels 24 and 25 extend upwardly from the fan housing and flank opposite sides 26 and 27 of the housing and preferably weld-connected thereto and affording a support for the fan. The housing 19 is provided with a tangential outlet 29 which leads into an air duct or nozzle 30, in the form of a rectangular pipe, which is extended upwardly and rearwardly from the fan cage to the forward end 32 of the separating or classifying chamber 33 of a guide or deflector generally indicated 34, which underlies directly beneath the discharge opening and comprises a pair of laterally spaced vertical side walls 35 and 36, which at their upper ends receive the elevator housing 12 therebetween and at their upper edges are connected as by rivets to the walls 27 and 26 respectively. The side walls 35 and 36 are interconnected at their lower edges by a transverse bottom wall 38 which slopes downwardly and forwardly to the forward open end or discharge opening 39 which is adapted to be positioned over the front end of the wagon for discharging the heavy material as shown in Figure 1.

The air duct 30 is connected at its discharge or air outlet end 40 to the bottom panel 41 of the elevator housing 12 by means of a bracket 42 and is positioned immediately above the opening 39 and projects an air stream indicated by the arrows 43 (Figure 3) between the walls 35 and 36 and intermediate the discharge outlet 16 of the elevator and bottom wall 38 of the separating chamber 33. The air stream 43 is directed to the upper open end 45 of the channel-shaped chute 34, the end 45 being relatively narrow as compared with the forward end 32 and communicating with a hood or deflector structure generally indicated 46 which comprises an arcuate top wall 47, which is in the path of the air stream 43 with its concave side 48 facing downwardly. The wall 47 extends between and is interconnected with rearward continuations or extensions 49 and 50 of the side walls 35 and 36 of the chamber structure 33. The top wall 47 of the hood extends upwardly and rearwardly from the upper end 10 of the elevator and has a rearwardly and downwardly open rear end 51 through which the lighter cotton is adapted to discharge.

The hood has a deflector, generally designated 53, telescoped thereover and said deflector has a pair of laterally spaced upright side walls 54 and 55, and disposed outwardly and flanging walls 49 and 50 of the hood 46 and the walls 54 and 55 are interconnected by an arcuate top wall or web 56, which overlies the top wall 47 of the hood. The hood 53 is pivoted beneath the hood 46 on a generally horizontal axis by means of a shaft 58 which extends through the opposite side walls 54 and 55, or the triangular panels 54 and 55, adjacent to the juncture of their bottom and forward adjacent edges 59 and 60, the pin 58 passing through the depending lugs 61 formed integral with walls 35 and 36 at the upper end of the wall 38 of the separating chamber. The deflector or hood 53 is provided with a bottom wall or web 63 which is curved upwardly and extends from the upper end of the wall 38 rearwardly in converging relation to wall 56 and in the upper position of member 53 is disposed in closing relation to the bottom portion and partially throttling the rear portion of the opening 51 of the hood 46, and it will be seen that the curvature of the wall 63 is so chosen that there is a material constriction of the opening 51 in the raised position of the hood as shown in Figure 3 whereby providing a venturi effect to accelerate the flow of the air through the constricted space in order to carry the cotton far to the rear end 9 of the wagon. However in the upper position of the distribution hood 53 the wall 63 is below the plane of wall 38. It will also be seen from a consideration of Figure 2 that when the hood 53 is positioned in its downward position to discharge downwardly, the area of the discharge opening 51 is materially increased and the volumetric dimension of the hood chamber 65 and the deflector chamber 66 is more than doubled thereby reducing the velocity of the air issuing from the discharge opening 67 of the deflector 53. This precludes blowing the air at high velocity to the portion of the wagon directly beneath the deflector and correlates the velocity to be imparted to the cotton in proportion to the distance at which it is to be projected and also reduces the possibility of smashing green bolls against the floor bottom, in the event that some of these do get through, with the consequent staining of the cotton.

The deflector 53 is pivotally connected as at 70 at a point above the axis of pivot from the pin 58 to the upper end of the control cable 71 which at its other end is pivotally connected as at 72 to an upright lever member 73 above its axis of pivot 74 on a detent assembly bracket 75. It will be seen that the cable 71 is positioned along one side of the housing of the elevator 11 and that it is maintained taut by means of a tension spring 77 which is connected to a bracket on the bottom wall 63 of the hood 53 and a bracket 78 weld-connected to the underside and depending from the bottom wall 38 of the separating chamber 33, the spring 77 tending to continuously urge the deflector 53 downwardly.

The lower end of the lever 73 is provided with a transverse or lateral extension 80 (Figure 6) and at each end of the extension 80 the lever is pivoted as at 81 and 82 to the forward ends of the rearwardly extending links 83 and 84. The link 83 being pivoted as at 85 to a valve plate 86 which is pivoted at 87 at a point below and rearwardly of the point 85 to the adjacent wall or panel 25 of the fan cage for swinging movement to closing and opening relation to an opening 89 (Figure 4) in the panel 25 providing an axial inlet to one end of the cage 19. Similarly, the rear end of the link 84 is pivoted as at 90 to a valve plate 91 which is pivoted as at 92 to the end plate 24 of the fan housing to swing in opening or closing relation relative to the air inlet opening 94 in the wall 24 providing an axial air inlet to the fan housing 19.

In operation it will be readily understood that in order to blow the cotton rearwardly, it is necessary to provide a high velocity large volume air stream and as will be readily apparent from Figure 5, this is accomplished in the raised position of the hood which constricts the opening 50 to increase air velocity as seen in Figure 3 and at the same time the air inlets for the blower are fully opened by the plates 86 and 91 being swung into the open position as best seen in Figure 5 so that a maximum air volume is developed. As the hood or deflector 53 is progressively lowered it will be readily appreciated that the valve plates progressively close opposite ends of the blower opening and at the same time the volumetric area of the chambers 65 and 66 of the hood 46 and the deflector 53 are increased and furthermore, the discharge opening 51 of the hood 46 is widened thereby reducing the air flow velocity in proportion to the need. The velocity of the air and volume being least when the deflector 53 is in its lowermost downwardly discharging position as illustrated in Figures 1, 2 and 4, and the greatest when the deflector 53 is in its upward rearwardly discharging position as seen in Figures 3 and 5.

It will be understood from the foregoing description that a simple cotton classifier and discharge mechanism is provided which is substantially fool-proof and incapable of misadjustment.

It will be seen that the shaft 21 of the fan 20 is driven by a belt drive train 95 which is operatively connected to the power source of the tractor 2 as will be readily understood by those skilled in the art.

What is claimed is:

1. In a material classifier for use with an elevator of a harvester having an elongated diagonally disposed housing with an upper end provided with a discharge opening in its underside through which elevated material may fall, a blower mounted on the elevator and having an air discharge nozzle arranged to direct a blast of air directly under said discharge opening so as to pass through the material discharged therefrom, an inclined channel-shaped receiving chute disposed below said opening and in longitudinal alignment with said nozzle and having a first open end below said nozzle for discharging heavy material and having a second discharge end remote from said nozzle for discharging light material, a deflector including a wall member extending outwardly from said upper end of said elevator and over said second open end of said chute in the path of the air stream passing through said chute for deflecting said lighter material outwardly, and a distributing hood having interconnected spaced top and bottom walls and upright laterally spaced side walls, said bottom wall extending outwardly from the bottom of said chute beneath and in spaced relation to said wall member of said deflector and defining a discharge opening therewith and said side walls disposed at opposite sides of said member and said top wall overlying said member, and means pivotally supporting said hood at a point below said wall member for vertical swinging movement whereby said hood is pivotal upwardly to discharge said material generally horizontally with concomitant movement of said bottom wall upwardly and constricting said discharge opening to increase the velocity of the air moving therethrough and pivoting said hood downwardly for discharging the material downwardly and enlarging said discharge opening to reduce the velocity of air passing therethrough, and said blower having an air inlet opening, valve means comprising a plate pivoted on the blower to swing across said opening to vary the area thereof, and means for conjunctively operating said hood and said valve means and connected to said hood and plate and formed and arranged to swing said plate to increase the area of the blower inlet while swinging said hood upwardly and to decrease the area of said blower inlet while pivoting said hood downwardly.

2. A material classifier and cleaner apparatus for use with an elevator of a cotton harvester having an elongated diagonally upwardly extending housing with a bottom discharge opening through which elevated material such as light mature cotton, heavy green cotton bolls and entrained debris may fall, means providing a classifying chamber disposed in receiving relation to the material descending from said discharge opening, a blower having an air discharge nozzle arranged to direct a blast of air through said classification chamber to pass through the material discharging thereinto from said said opening, said means incorporating a distribution hood communicating with said chamber and disposed in the path of the air blast to receive the light cotton and direct it into an associated receptacle, said distribution hood pivotal on a generally horizontal axis, said blower comprising a fan cage having an air inlet opening, a valve member positioned adjacent to said air inlet opening and movable over and away therefrom to vary the area thereof, a lever pivotally supported intermediate its ends and operatively connected at one side of said axis to said valve member and at the opposite side of said axis to said distribution hood for moving said valve member to covering position with respect to said air inlet opening of said fan cage while simultaneously pivoting said distribution hood to discharge downwardly and to move said valve member to uncovering position relative to said air inlet opening while simultaneously pivoting said hood to discharge outwardly.

3. A material classifier and cleaner apparatus for use with an elevator of a cotton harvester having an elongated diagonally upwardly extending housing with a bottom discharge opening through which elevated material such as light mature cotton, heavy green cotton bolls and entrained debris may fall, means providing a classifying chamber disposed in receiving relation to the material descending from said discharge opening, a blower having an air discharge nozzle arranged to direct a blast of air through said classification chamber to pass through the material discharging thereinto from said opening, said means incorporating a distribution hood communicating with said chamber and disposed in the path of the air blast to receive the light cotton and direct it into an associated receptacle, said distribution hood pivotal on a generally horizontal axis, said blower comprising a fan cage having an air inlet opening, a valve member positioned adjacent to said air inlet opening and movable over and away therefrom to vary the area thereof, a lever pivotally supported intermediate its ends and operatively connected at one side of said axis to said valve member and at the opposite side of said axis to said distribution hood for moving said valve member to covering with respect to said air inlet opening of said fan cage while simultaneously pivoting said distribution hood to discharge downwardly and to move said valve member to uncovering position relative to said air inlet opening while simultaneously pivoting said hood to discharge outwardly, and said lever pivoted on a generally horizontal axis and said valve member comprising a plate pivoted on a generally horizontal axis to said cage and said connection between said lever and said hood comprising a cable extending therebetween and said connection between the lever and said valve member comprising a link pivoted at one end to the lower end of the said lever and at the other end to said valve member.

4. A material classifier and cleaner apparatus for use with an elevator of a cotton harvester having an elongated diagonally upwardly extending housing with a bottom discharge opening through which elevated material including light mature cotton, heavy green cotton bolls and other entrained material may fall, means providing a classifying chamber disposed in receiving relation to the material falling from the discharge opening, a blower having an air discharge nozzle arranged to direct a blast of air through said classification chamber to pass through the material discharging thereinto from said discharge opening for separating the light mature cotton from the remaining material, said means incorporating a distribution hood communicating with said classification chamber and disposed in the path of the ar blast to receive the light cotton and direct it into an associated receptacle, said distribution hood pivotal on a generally horizontal axis and having an upper position for directing the cotton instantly outwardly and swingable to a downwardly discharging position for directing the cotton at a point close thereto and immediately therebelow, said blower comprising a fan cage extending transversely of the housing and supported therefrom adjacent to its lower end having an air inlet opening at each end, a valve plate pivoted on each side of said cage for swinging movement to covering and uncovering positions relative to the adjacent inlet opening, a lever pivoted intermediate its ends on a generally horizontal axis on one side of the housing and extending to a lower end below the housing and having a transverse portion extending from said lower end to the opposite side of the housing and thereat having an upstanding portion, a link pivoted at one end to said lower end of the lever and at its other end to the adjacent valve plate, another link pivoted at one end to said upstanding portion and at its other end to the adjacent valve plate, and a linkage pivoted at one end to said lever at a point above its axis of pivot and pivoted to said hood at a point whereat movement of the hood to upper position simultaneously actuated said links to swing the respective valve plates to uncover said inlet openings and movement of said hood toward said downwardly discharging position simultaneously effects gradual closing movement of said plates with respect to said air inlet openings.

5. A cotton cleaner and distributor for use in conjunction with a cotton harvester having an upwardly directed cotton elevator housing with an upwardly directed cotton conveyor therein and an upper end portion with a cotton discharge opening facing downwardly and rearwardly of the housing for discharging downwardly and rearwardly of the elevator a stream of cotton comprising mature cotton, immature cotton and foreign matter; said cleaner and distributor including: a channel-shaped chute disposed beneath said opening and having a pair of upright walls flanking and connected to opposite sides of said housing and having a bottom wall interconnected between and with said upright walls defining a material classification chamber, said chute having inner and outer open ends and said bottom wall inclining downwardly toward said inner end whereby said area of the opening of said inner end is larger than that of the outer end; a blower mounted on the elevator and having an air duct extending into the inner end of said chute and arranged to direct a blast of air longitudinally of the housing through said classification chamber; a deflector comprising side portions formed as extensions of said upright side walls of said chute and further comprising a top wall extending outwardly from the upper end portion of the housing and interconnecting said side portions, said top wall curved outwardly and positioned in the path of the air stream issuing from said outer end of the chute for directing outwardly said air stream and the material entrained therein; a distributing hood telescoped over said deflector and comprising a pair of upright side panels disposed outwardly of and alongside respective side portions of the deflector, means hingedly connecting said side panels at their lower extremities to the bottom of said hood at said outer open end thereof to accommodate vertical swinging movement of the hood, a bottom web interconnecting said side panels of the hood and extending outwardly from the adjacent end of the bottom wall of said chute, and a top web interconnecting said side panels and overlying said top wall and with said panels and bottom web defining a tubular hood, said hood movable upwardly whereby said bottom web thereof is pivoted upwardly and providing a constricted outlet for the deflector with its top wall, and said hood pivoted downwardly with attendant movement of said bottom web downwardly away from said top wall to enlarge said opening to discharge the material downwardly, and a control element extending alongside said housing and having one end pivoted to said hood above its axis of pivot, a lever pivoted to one side of said housing for vertical swinging movement, means pivoting the other end of said element to said lever above its axis of pivot, said blower comprising a fan cage having air inlet openings, a plate pivotally supported to swing across said opening to vary the area of said opening, and a link pivoted at one end to said lever below its axis of pivot and pivoted at its other end to said plate to swing said plate in a direction uncovering said air inlet opening while said hood is swung upwardly and to close said air inlet opening when said hood is swung downwardly.

6. In a classifier and cleaner, the combination of a conveyor, a classifier disposed in receiving relation to a stream of material descending from the conveyor and including a distribution hood pivotal on a generally horizontal axis for directing the classified material into an associated container, a blower having a nozzle providing an air jet directed into the classifier through said stream of material for separating the material and blowing the lighter material through the hood, said blower having an air inlet opening, valve means associated with the blower for selectively opening and closing said air inlet opening, and an operating linkage interconnecting said valve means with said hood for automatically opening said valve means in one position of the hood, discharging said classified material distantly and closing said valve means in another position of the hood, discharging said classified material closely thereto attendant to and in response to said positioning of the hood.

7. For use in a harvester having an upwardly extending conveyor for elevating harvested crops, means for directing the crops to an associated receptacle including a hood structure disposed in receiving relationship to said conveyor, said hood structure pivotal on a generally horizontal axis and swingable upwardly and downwardly and having a rear end presenting a discharge opening, said hood having an elevated position facing said discharge opening rearwardly for directing material distantly rearwardly therefrom and having a lowered position facing said discharge opening downwardly for discharging material immediately therebelow, a blower operatively associated with said conveyor and having a means for delivering an air stream through said hood for moving said crops therethrough, said blower having an air inlet opening, valve means operatively associated with said air inlet opening of the blower for selectively opening and closing it, and an operating linkage interconnecting said valve means with said hood and operative to open said inlet opening in response to positioning of said hood in its elevated position for delivering a maximum volume of air through said hood, and said linkage operative to gradually close said inlet opening of the blower as said hood is swung downwardly to the lowered position thereof to reduce said volume of air through the hood.

8. In a material separating apparatus comprising a housing from which indiscriminately commingled heavier and lighter material is discharged to gravitate in a material stream and an air blast issuing from an air discharge outlet at one side of said stream of material transverses the material with sufficient intensity to permit the heavier material to continue downwardly while causing the lighter material to depart from the stream generally in the direction of the blast and wherein a deflector mounted adjacent to said stream of material opposite to the air discharge outlet is positioned to intercept the blast containing the lighter material for redirecting the lighter material, the improvement comprising: means pivotally mounting the deflector for swinging transversely of the blast, a source of air supply communicative with said outlet, means for controlling the volume of air from said supply source, and means operatively interconnecting said deflector and said control means for throttling the air supply and conjunctively swinging said deflector across said blast for directing the lighter material downwardly to deposit the lighter material closely and for increasing the air supply while swinging said deflector in a direction generally paralleling said air blast for depositing the lighter material distantly.

References Cited in the file of this patent
UNITED STATES PATENTS

| | | |
|---|---|---|
| 845,876 | Luke | Mar. 5, 1907 |
| 2,026,910 | Olsen | Jan. 7, 1936 |
| 2,163,706 | Sayers | Aug. 5, 1938 |
| 2,645,821 | Fowler | July 21, 1953 |